US010554615B2

(12) United States Patent
Teverovsky et al.

(10) Patent No.: US 10,554,615 B2
(45) Date of Patent: Feb. 4, 2020

(54) DIRECTORY SERVICE STATE MANAGER

(71) Applicant: Semperis, New York, NY (US)

(72) Inventors: Guy Teverovsky, Kefar Sava (IL); Dan Croitoru, Haifa (IL); Matan Liberman, Ramat Gan (IL); Michael Bresman, Hoboken, NJ (US); Darren Mar-Elia, San Anselmo, CA (US)

(73) Assignee: SEMPERIS, New York, NY (US)

( * ) Notice: Subject to any disclaimer, the term of this patent is extended or adjusted under 35 U.S.C. 154(b) by 0 days.

(21) Appl. No.: 15/915,943

(22) Filed: Mar. 8, 2018

(65) Prior Publication Data
US 2019/0281010 A1 Sep. 12, 2019

(51) Int. Cl.
H04L 29/12 (2006.01)
H04L 29/06 (2006.01)

(52) U.S. Cl.
CPC ...... H04L 61/1552 (2013.01); H04L 61/1523 (2013.01); H04L 63/1416 (2013.01)

(58) Field of Classification Search
CPC ............. H04L 61/1523; H04L 61/1552; H04L 63/1416
See application file for complete search history.

(56) References Cited

U.S. PATENT DOCUMENTS

| 7,278,065 B2 * | 10/2007 | Conkel | G06F 11/0709 707/E17.005 |
| 2004/0064731 A1 * | 4/2004 | Nguyen | H04L 41/046 726/22 |
| 2004/0267835 A1 * | 12/2004 | Zwilling | G06F 11/1451 |
| 2007/0043674 A1 * | 2/2007 | DiFalco | G06Q 10/00 705/51 |
| 2010/0005124 A1 * | 1/2010 | Wagner | G06F 16/27 707/E17.005 |
| 2015/0127678 A1 * | 5/2015 | Zhou | G06F 17/30589 707/770 |
| 2015/0261799 A1 * | 9/2015 | Winstead | G06F 17/30309 707/638 |
| 2018/0077183 A1 * | 3/2018 | Swann | H04L 63/1425 |

OTHER PUBLICATIONS

"Monitoring Active Directory for Signs of Compromise". Microsoft. May 31, 2017. pp. 1-19. (Year: 2017).*
"The Security Monitoring Guide and Attack Detection Planning Guide". Microsoft. pp. 1-42. (Year: 2005).*

* cited by examiner

Primary Examiner — John M Macilwinen
(74) Attorney, Agent, or Firm — Lowenstein Sandler LLP

(57) ABSTRACT

Technology for analyzing and tracking states of a directory service by correlating changes from multiple different data sources related to the directory service. A first data source may be based on synchronization data of the directory service and a second data source may be based on security data of one or more domain controllers hosting the directory service. The synchronization data and security data may both correspond to changes to the directory service but may include different information. For example, synchronization data may provide the content of a modification to the directory service and the security data may provide an entity that initiated the modification. The multiple sources may be used to generate and enrich modification data of the directory service. The modification data may be used to determine a prior state of the directory service, to undue modifications initiated by a particular user, or to detect malicious activity.

20 Claims, 4 Drawing Sheets

DIRECTORY SERVICE STATE MANAGER

COPYRIGHT NOTICE

Portions of the disclosure of this patent document may contain material subject to copyright protection. The copyright owner has no objection to the facsimile reproduction by anyone of the patent document or the patent disclosure, as it appears in the United States Patent and Trademark Office patent file or records, but otherwise reserves all copyright rights whatsoever.

TECHNICAL FIELD

One or more implementations relate generally to directory services in a computing environment and, more specifically, to tracking and analyzing changes to a directory service.

BACKGROUND

Modern computing environments often include a directory service to manage the users and devices that participate in the computing environment. The directory service may function as a centralized mechanism to authenticate entities (e.g., users or devices) and may authorize or restrict the entities from performing certain computing tasks. The directory service may support one or more domains that are used to organize user accounts, computing resources, or a combination thereof. Each user or device may authenticate with the directory service and may then access shared resources over a network without authenticating to each individual shared resource. For example, the directory service may enable a user to log into a computer that the user has not previously accessed by providing credentials that are recognized by the directory service. The user may use the computing device to access network resources, such as shared data storage or printers, without providing the credentials to the network resource.

BRIEF DESCRIPTION OF THE DRAWINGS

The included drawings are for illustrative purposes and serve to provide examples of possible structures and operations for the disclosed inventive systems, apparatus, methods, and computer-readable storage media. These drawings in no way limit any changes in form and detail that may be made by one skilled in the art without departing from the spirit and scope of the disclosed implementations.

DETAILED DESCRIPTION

Figure 1:
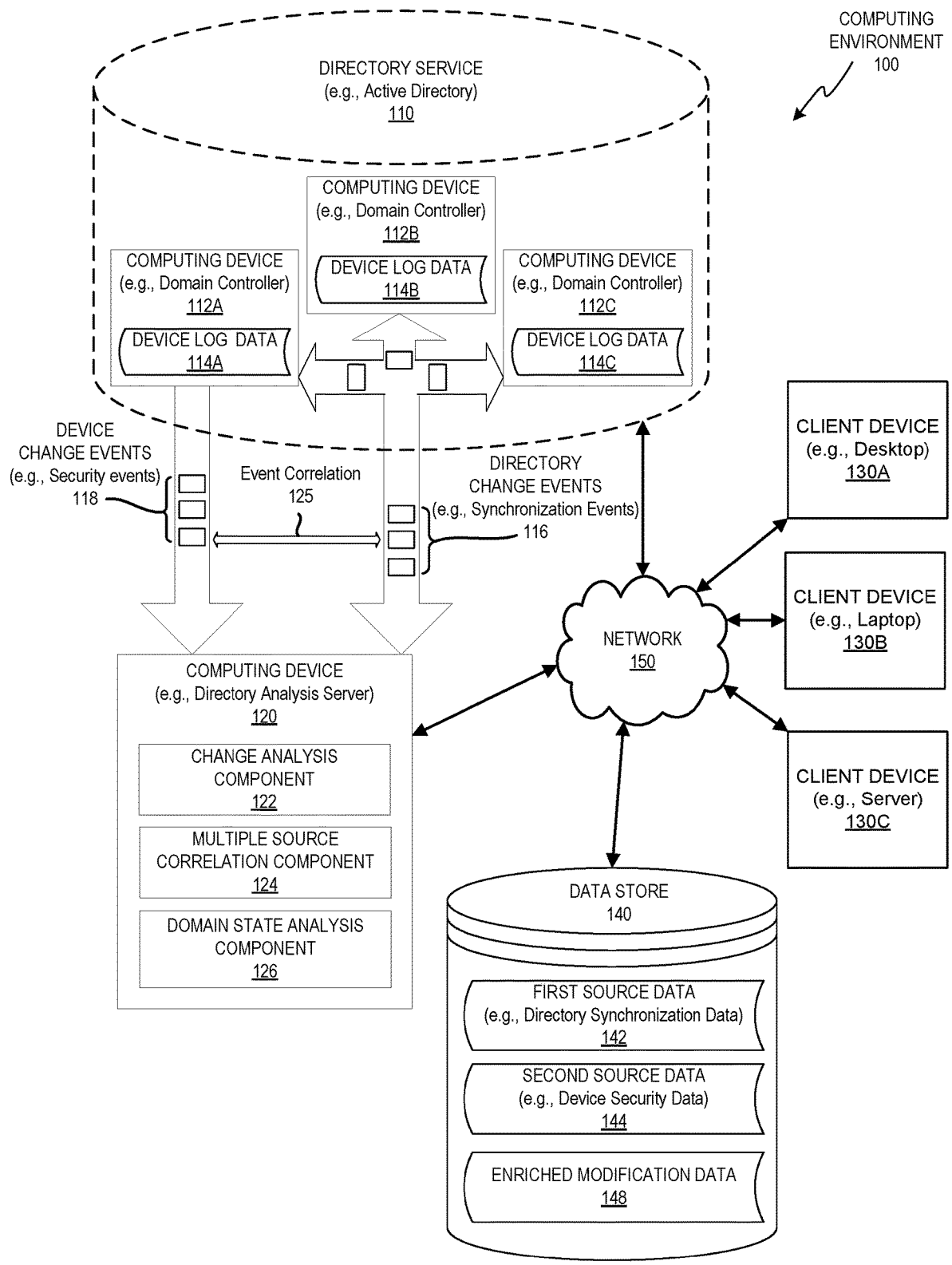
FIG. 1 shows a block diagram of an example computing environment in which a directory service may be implemented, according to some implementations.

Examples of systems, computer-readable storage media and methods according to the disclosed implementations are described in this section. The examples are being provided solely to add context and aid in the understanding of the disclosed implementations. It will thus be apparent to one skilled in the art that the disclosed implementations may be practiced without some or all of the specific details provided. In other instances, certain process or method operations, also referred to herein as "blocks," have not been described in detail in order to avoid unnecessarily obscuring the disclosed implementations. Other implementations and applications also are possible, and as such, the following examples should not be taken as definitive or limiting either in scope or setting.

In the following detailed description, references are made to the accompanying drawings, which form a part of the description and in which are shown, by way of illustration, one or more specific implementations. Although these disclosed implementations are described in sufficient detail to enable one skilled in the art to practice the implementations, it is to be understood that these examples are not limiting, such that other implementations may be used and changes may be made to the disclosed implementations without departing from their spirit and scope. For example, the blocks of the methods shown and described herein are not necessarily performed in the order indicated in some other implementations. Additionally, in some other implementations, the disclosed methods may include more or fewer blocks than are described. As another example, some blocks described herein as separate blocks may be combined in some other implementations. Conversely, what may be described herein as a single block may be implemented in multiple blocks in some other implementations. Additionally, the conjunction "or" is intended herein in the inclusive sense where appropriate unless otherwise indicated; that is, the phrase "A, B or C" is intended to include the possibilities of "A," "B," "C," "A and B," "B and C," "A and C" and "A, B and C."

Implementations of technology to enhance state management of a directory service are provided herein and may enhance the auditing and comparison of changes to a directory service. Many directory services are continuously modified during the course of their operation. The modifications may involve the creation, deletion, updating, or other operation of one or more computing objects associated with the directory service. The computing objects may include one or more individuals or groups of users and they may be updated to change permissions, group memberships, other modification, or a combination thereof. The modifications may be the result of the normal operation of a computing environment or may be the result of operations by a malicious entity intending to compromise the computing environment. A malicious entity may make modifications to the directory service to gain access to one or more resources and may perform operations to hide the modifications. For example, a malicious entity may disable change tracking features prior to making a modification and then re-enable the change tracking features after the modification is made. This may avoid the tracking feature from detecting the modification and therefore avoid any alert or detection mechanisms implemented in the computing environment.

Aspects of the present disclosure may address the above noted and other deficiencies by introducing technology to enhance the tracking of directory service changes. In an illustrative implementation, the technology may enable a computing device to enhance tracking by correlating changes from multiple different data sources that are related to the directory service. A first data source may include synchronization data of the directory service and the second data source may include security data of one or more domain controllers that provide the directory service. The synchronization data and security data may both correspond to changes to the directory service but may include different types of information. For example, synchronization data may provide modification data indicating a change to the directory service and the security data may provide an entity or entities that initiated the change. The multiple sources may be used to generate and enrich modification data that represents the changes to the directory service. The modification data may be used to determine a prior state of the directory service, to revert some or all of the changes, or to detect modification inconsistencies. The modification inconsistencies may include a change to the directory resource that is reflected by one of the sources but is missing from one or more other sources. For example, the synchronization data may indicate that a change was made to the directory service but the security log may be absent any record of the change.

Systems and methods described herein include technology that enhances the directory services of a computing environment. In particular, aspects of the present disclosure may enable a computer system to determine a prior state of the directory service and compare multiple prior states of the directory service to identify the objects (e.g., domain objects) that were modified and to identify the particular user that made the modification. In some examples, the present disclosure may enable the computer system to revert to a prior state of the directory service or to remove some or all changes that occurred between prior points in time or that were initiated by the particular user. Aspects of the present disclosure may also or alternatively enable the computer system to perform intrusion detection by comparing the multiple sources to detect inconsistencies that may be the result of malicious activity.

Various aspects of the above referenced methods and systems are described in details herein below by way of examples, rather than by way of limitation. The examples discussed below reference Microsoft® Active Directory® but other versions of directory services may be used in addition or as an alternative.

FIG. 1 shows a block diagram of an example computing environment 100 with an enhanced directory service state management feature, in accordance with some implementations. It should be noted that other arrangements for computing environment 100 are possible, and that the implementation of a computer system utilizing embodiments of the disclosure are not necessarily limited to the specific environment depicted. In the example shown, computing environment 100 may include a directory service 110, a computing device 120, client devices 130A-C, a data store 140, and a network 150. In some other implementations, computing environment 100 may not have all of these components or systems, or may have other components or systems instead of, or in addition to, those listed above.

Directory service 110 may be a shared information infrastructure for locating, managing, administering, and organizing computing objects of a computing environment 100. Directory service 110 may include one or more domains to organize the computing objects. The computing objects may represent computing resources such as users (e.g., user accounts), groups, devices (e.g., desktops, printers), data storage objects (e.g., files, records), other objects, or a combination thereof. Each computing object may be associated with identification data (e.g., object name and type), access control data (e.g., permissions), membership data (e.g., group membership), other data, or a combination thereof. In one example, directory service 110 may function as a centralized authentication mechanism that enables one or more client devices 130A-C to access or use computing objects within computing environment 100. Each user or device may authenticate with directory service 110 to access shared resources over a network without individually authenticating to each shared resource.

Directory service 110 may support proprietary protocols, standardized protocols, or a combination thereof. In one example, directory service 110 may be the same or similar to Microsoft® Active Directory® and may support client devices that run Microsoft Windows®, Linux®, other operating system, or a combination thereof. In another example, directory service 110 may be any directory service that supports a directory access protocol (DAP), such as the Lightweight Directory Access Protocol (LDAP). LDAP may be an industry standard application protocol for accessing and maintaining distributed directory information services in a vendor-neutral manner over an Internet Protocol (IP) network. In either example, directory service 110 may be provided to client devices by one or more computing devices 112A-C.

Computing devices 112A-C may be any computing device capable of executing computer functionality to implement directory service 110. Computing devices 112A-C may be server devices that provide directory service 110 to the one or more client devices 130A-C. In one example, each of the computing devices 112A-C may be a domain controller (DC) and may support one or more Active Directory (AD) domains, LDAP domains, other domains, or a combination thereof. Computing devices 112A-C may be geographically collocated at a single site (e.g., office building or campus), geographically distributed across one or more sites, or a combination thereof. Each of the computing devices 112A-C may include a portion of the directory service (e.g., a single domain) or all of the directory service 110 (e.g., all domains). Each of computing devices 112A-C may service some, all, or none of the users or client devices associated with the domain. For example, a computing device at a site may service the users and devices at the particular site and one of the computing devices may function as a redundant domain controller or a backup domain controller and may not service any users or clients. Computing devices 112A-C may transmit directory change events 116 to one or more other computing devices to keep their respective versions of the directory service synchronized.

Directory change events 116 may be transmitted between computing devices and may indicate modifications that have occurred to directory service 110 over a particular duration of time. The modifications to directory service 110 may originate on any one of the computing devices 112A-C and may be transmitted to the other computing devices so that each of the other computing devices can apply the change to their local version of the directory service. Directory service 110 may include a mechanism to track the modifications that exist on each of the computing devices whether the modification originated on that computing device or originated on one of the other computing devices. In one example, directory service 110 may associate modification data with a change identifier that comprises one or more sequential change values. The computing devices participating in the directory service may compare one or more change identifiers from a local device or remote device to determine if one of the computing devices is missing any changes. The computing device may then request or retrieve the missing modification data from one of the other computing devices. The missing modification data may relate to the addition, deletion, or modification of one or more computing objects associated with the directory service.

The computing objects associated with a directory service may be also or alternatively referred to as directory objects or domain objects. The computing object may be associated with an object identifier or one or more object identifiers (e.g., domain identifier combined with a user identifier). An object identifier may be any type of identification information and may include a universally unique identifier (UUID), globally unique identifier (GUID), other numeric or non-number identifier, or a combination thereof. The identification information may include binary, numeric, alphanumeric, non-numeric, other data, or a combination thereof. Each of the directory change events 116 may be associated with or include information indicative of one or more domains, domain objects, changes, times, other information, or a combination thereof. The directory change events 116 may indicate one or more object identifier and information indicative of one or more changes to the computing object. In one example, directory change events 116 may be synchronization events and may include synchronization data used to keep different versions of a directory synchronized across multiple computing devices 112A-C. Directory change events 116 are discussed in more detail in regards to the first source data 142 of FIG. 2.

Device change events 118 may be similar to the directory change events 116 but may relate to any event that affects a computing device and may not be limited to changes to directory service 110. Device change events 118 may include data derived from device log data 114. Device log data 114 may include any change event that affects a particular computing device. Device log data 114 may include individual log entries that are the same or similar to device change events and represent individual or aggregate changes to the particular computing device. Device log data 114 may be organized using one or more data structure that store events that occur on or are affected by the particular computing device.

The data structures may function as a log repository and may include one or more database objects (e.g., table, record, tuple, key-value pair), file system objects (e.g., files, directories), other data storage objects, or a combination thereof. In one example, device log data 114 may be contained within one or more log files that may be modified in a circular manner so that when a log file hits a particular threshold (e.g., size, event quantity, or time threshold) the new log entries overwrite prior log entries. In another example, device log data 114 may be contained within one or more database logs that comply with a database schema, such as an extensible markup language (XML) database schema. In either example, the entries within the log may represent change events indicating errors, warnings, informational events, other events, or a combination thereof.

The data within device log data 114 may originate from executable code executing on one of the devices in the computing environment 100 (e.g., computing devices 112A-C, client devices 130A-C). The executable code generating the events may correspond to one or more hardware devices (e.g., hardware events), security modules (e.g., security events), applications (e.g., application events), operating system (e.g., operating system events), other executable code, or a combination thereof. In one example, device change events 118 may correspond to security events that indicate a computing entity (e.g., user account or computer account) that initiated a change event. Device change events 118 are discussed in more detail in regards to the second source data 144 of FIG. 2.

Computing device 120 may be the same or similar to computing devices 112A-C and may function to analyze and track changes to directory service 110. As shown in the example of FIG. 1, computing device 120 may analyze directory service 110 without providing the directory service 110 (e.g., without functioning as a domain controller) to the one or more client devices 130A-C. In another example, computing device 120 may be the same as computing device 112A and may analyze directory service 110 and provide directory service 110 (e.g., function as a domain controller) to one or more of the computing devices 112A-C. Computing device 120 may analyze directory service 110 using a combination of one or more components that may include a change analysis component 122, a multiple source correlation component 124, and a domain state analysis component 126.

Change analysis component 122 may receive and store change events from multiple different data sources. A first data source may be based on changes of the directory service (e.g., directory change events 116) and a second data source may be based on changes of one or more computing devices 112A-C that provide the directory service 110 (e.g., device change events 118). Change analysis component 122 may receive the change events from the different sources and perform event aggregation to summarize the events into one or more aggregated events. Each aggregated event may correspond to a cluster of related change events from the same data source. The content of the change events or aggregated events may be stored in data store 140 as first source data 142 (e.g., directory data) and second source data 144 (e.g., device data) respectively.

Multiple source correlation component 124 may analyze the data from each of the multiple sources and correlate changes across the multiple sources as illustrated by event correlation 125. This may involve identifying relationships between the data of a first source and data of a second source. The relationships may be based on object data, time data, location data, device data, entity data, other data, or a combination thereof. The relationships may be used to identify a change event from the first source that corresponds to a change event of the second source. Each of the change events may be related to the same underlying event but may be generated and stored in a different source. The change events from different sources may include different data (e.g., types of information). For example, first source data 142 may indicate the results of a change event (e.g., creation of a directory object) whereas second source data 144 may indicate the cause of the change events (e.g., user account initiating the creation). Multiple source correlation component 124 may combine data from different sources to create enriched modification data 148.

Domain state analysis component 126 may access enriched modification data to determine one or more states of directory service 110 at different points in time. Domain state analysis component 126 may interpret the enriched modification data 148 to determine a prior state of the directory service 110. This may be used to compare multiple states of the directory service. For example, the current state of the directory service 110 may be compared to the prior state of the directory service to determine what directory objects have been modified. In another example, domain state analysis component 126 may detect inconsistencies between modification data between sources, such as modifications that are represented by first source data 142 but not by second source data 144. This may indicate that a problem (e.g., malicious activity, data corruption, service failures) has occurred. Domain state analysis component 126 may also enable computing device 120 to modify directory service 110 to revert to a prior state or to remove one or more changes initiated by a particular user.

Data store 140 may be any data storage device or a combination of data storage devices that are capable of storing the data of directory change events 116 and device change events 118. Data store 140 may be a distributed storage system for storing and managing structured data in a manner that provides dynamic control over data layout and format. In the example shown in FIG. 1, the first source data 142 and the second source data 144 may include copies of directory change events 116 and device change events 118 received by computing device 120. The change events may be stored in any format including binary format, textual format, other format, or a combination thereof. In another example, first source data 142 and second source data 144 may include data derived from directory change events 116 and device change events 118 without including a copy of the change events received by computing device 120. In other examples, data store 140 may include a combination of the received change events and data derived, correlated, or distilled from the received change events.

Client devices 130A-C may function as directory service clients and may include server computers, desktop computers, laptop computers, mobile phones, tablet computers, other computing devices, or a combination thereof. In some implementations, client devices 130A-C may be referred to as a "computer devices," "user devices," "server devices" other variation, or a combination thereof. In the example shown in FIG. 1, client devices 130A-C are separate from computing devices 112A-C of directory service 110. In other examples, client devices 130A-C may be included within the computing devices 112A-C of directory service 110 (e.g., also provide domain controller functionality).

Network 150 may include any network or combination of networks of systems or devices that communicate with one another. For example, the network 150 can be or include any one or any combination of a LAN (local area network), WAN (wide area network), telephone network, wireless network, cellular network, point-to-point network, star network, token ring network, hub network, or other appropriate configuration. The network 150 can include a TCP/IP (Transfer Control Protocol and Internet Protocol) network, such as the global internetwork of networks often referred to as the "Internet" (with a capital "I"). The Internet will be used in many of the examples herein. However, it should be understood that the networks that the disclosed implementations can use are not so limited, although TCP/IP is a frequently implemented protocol.

Figure 2:
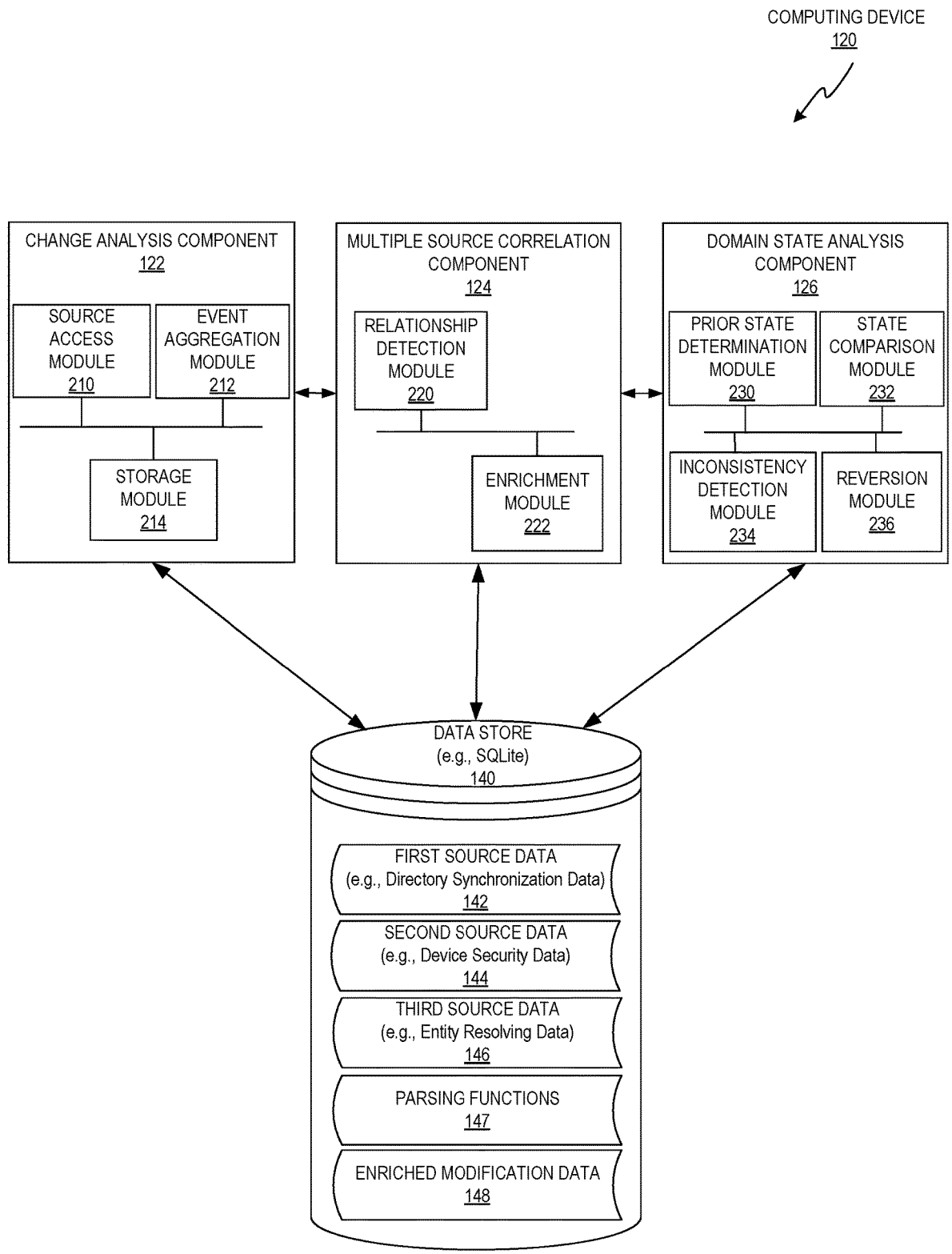
FIG. 2 shows a block diagram of example implementations of components of FIG. 1 and example interconnections between the components according to some implementations.

FIG. 2 depicts a block diagram illustrating an exemplary computing device 120 that functions as a directory service state manager, in accordance with aspects of the disclosure. Computing device 120 may be the same or similar to computing device 120 of FIG. 1 and may include a change analysis component 122, multiple source correlation component 124, and a domain state analysis component 126. More or less components or modules may be included without loss of generality. For example, two or more of the components may be combined into a single component, or features of a component may be divided into two or more components. In one implementation, one or more of features of a component may be executed on different computing devices (e.g., a server device and a client device).

Change analysis component 122 may receive and store change events from multiple different data sources. A first data source may be based on change events of the directory service (e.g., directory change events 116) and a second data source may be based on changes of one or more computing devices that provide the directory service 110 (e.g., device change events 118). Each of the computing devices may function as a domain controller and the directory service may include one or more active directory domains, LDAP domains, or a combination thereof. Each domain controller may provide the directory service to a plurality of client devices and implement a lightweight directory access protocol (LDAP). In one example, change analysis component 122 may include a source access module 210, an event aggregation module 212, and a storage module 214.

Source access module 210 may access change event data from multiple different data sources. The data sources may include data sources with change events specific to a particular directory service and data sources with change events specific to a particular computing device. The computing device may provide the directory service (e.g., domain controller), consume the directory service (e.g., domain client), or a combination thereof. The data sources may be accessed using different access mechanisms. The access mechanisms may involve an active access mechanism that requests data from the computing device creating the change event or a passive access mechanism that monitors data or reads the data without explicitly requesting the data from the computing device creating the change events. Passive access mechanisms may involve reading data from a log or monitoring data requests or operations without notifying the executable code or computing device that generated the change event. The monitoring may be performed by executable code (e.g., monitoring agent) that executes on the same computing device or a different computing device that generates the change event. In one example, one of the sources may be accessed using an active access mechanism and another source may be accessed using a passive access mechanism. In other examples, both sources may be accessed using an active access mechanism or both may be accessed using a passive access mechanism.

First source data 142 may be based on change event data of the directory service and may contain modification data that is derived from directory change events. In one example, an active access mechanism may be used to obtain first source data 142. The active access mechanism may involve computing device mimicking a domain controller in order to receive synchronization data (e.g., synchronization packets) from the directory service. The computing device 120 may transmit requests to the directory service or to a computing device hosting the directory service and receive the directory change events in response. In another example, a passive access mechanism may be used by the computing device 120 and may involve monitoring synchronization data sent from or received by one or more of the domain controllers. The monitoring may occur by having an agent on the domain controller or on an external device that monitors network traffic between domain controllers.

The directory service may include a synchronization mechanism for tracking the changes of different directory service instances and for sharing the tracked changes with other computing devices. As discussed above, the directory service may be provided by one or more computing devices that are located across one or more geographic locations. The one or more computing devices may store one or more instances (e.g., copies, versions) of the directory service. In one example, each computing device may store an instance of the directory service. In another example, an instance of the directory service may be shared or provided by a combination of computing devices. In other examples, one geographic site may include an instance of the directory service on a single computing device and another geographic site may include an instance of the directory service that is shared across multiple computing devices. This may be done to handle different quantities of users, devices, activity, other factors, or a combination thereof.

The synchronization mechanism may support bidirectional synchronization, unidirectional synchronization, or a combination thereof. The bidirectional or unidirectional synchronization may correspond to a portion of a directory service or the entire directory service and involve replicating, duplicating, copying, moving, migrating, other action, or a combination thereof. Bidirectional synchronization may involve a computing device transmitting changes that affected a local instance of a directory service and receiving changes from other devices that affected one or more remote instance of the directory service. Unidirectional synchronization may receive changes from other computing devices that affected remote instances without transmitting changes affecting a local instance. This may occur when there are no changes originating at the receiving computing device. This may be the result of the local instance of the directory service functions as a backup, recovery, failover, load balancing, other purpose, or a combination thereof. This may also occur when computing device 120 is mimicking a domain controller and is absent a local instance of the directory. In which case, computing device 120 may store the directory change events without applying them to an existing instance of the directory.

The synchronization mechanism may include a programming interface to access a set of synchronization operations that are native to the directory server (e.g., native to Active Directory service). The programming interface may be accessible locally or remotely (e.g., over a network) using an application programming interface (API). Source access module 210 may utilize a set of native synchronization operations to submit a request to the directory service and receive one or more change events of the directory service. The request may identify one or more change events, times, computing devices, computing objects (e.g., directory objects, computing entities), other objects, or a combination thereof. In one example, the request may include one or more change values. A change value may be any data used to identify a change event or a set of change events (e.g., range of change events). In one example, the request may identify one or more change events that originate from or have been applied to a local instance of the directory service. In another example, the request may identify one or more change events that are missing from the local instance of the directory service and need to be retrieved from another computing device hosting the directory service. In either example, the source access module 210 may communicate before, during, or after transmitting the request to determine which change events have been applied to a remote instance to determine whether the local instance is current. The communication may involve polling one or more of the other computing devices based on preset intervals, scheduled times, synchronization timeouts, system events (e.g., reboot, change receipt), or a combination thereof.

Second source data 144 may be based on change event data of one or more of the computing devices that host the directory service and in one example may include security data. As discussed above, each of the computing devices may include device log data that is stored in one or more data structures (e.g., log files or log database) that are associated with security logs, application logs, setup logs, system logs, other logs, or a combination thereof. The device log data may be stored local to or remove from the computing device that generates the log data. Storing data locally may involve storing device change events on a local data storage device (e.g., hard drive) and storing device data remotely may involve storing change events on a remote data storage device that is accessible over a network (e.g., network storage, network attached storage (NAS), storage area network (SAN), other device, or a combination thereof).

Source access module 210 may access device log data using an active access mechanism, passive access mechanism, or a combination thereof. In one example, source access module 210 may use an active access mechanism by transmitting a request to the computing device that generated the device log data. In another example, source access module 210 may use a passive access mechanism by accessing the device log data without contacting the computing device that generated the device log data. This may occur when the source access module 210 has access to the device log data directly or through a remote computing device other than the computing device that generated the device log data. In either example, source access module 210 may generate one or more requests that may include criteria for identifying device log data. The criteria may be query criteria that identify one or more time data (e.g., a point or duration of time), event type data (e.g., security, application, system), computing entity data (e.g., user or device), event category data (e.g., warning, error, information), computing object data (e.g., directory objects), other object data, or a combination thereof.

Source access module 210 may enable computing device 120 to transmit a request for directory change events or device change events to a remote computing device and may receive over a communication channel (e.g., network connection) the corresponding change events. The corresponding change events may be received over the communication channel as individual change events (e.g., discrete change events), as groups of change events (e.g., batched change events), as a stream of change events (e.g., data stream, data feed), other form, or a combination thereof. The change events may be received in a chronological order (e.g., first-in first-out (FIFO)), in a reverse chronological order (e.g., last-in first-out (LIFO)), a non-chronological order, other order, or a combination thereof. In one example, the request for change events may correspond to a set of existing change events. In another example, the request may function to subscribe the computing device to a set of change events that include historical change events, current change events, and future change events. In either example, source access module 210 may access change events for the directory service and change events for a particular device and these change events may be analyzed and aggregated by event aggregation module 212.

Event aggregation module 212 may perform event aggregation on the change events retrieved by source access module 210 and produce one or more aggregate events. The aggregate events may be referred to as aggregated events, aggregation events, root cause events, other term, or a combination thereof. Each aggregate event may summarize some or all of the data contained in a set of related underlying change events. In one example, an aggregate event may be a logical event and may represent one or more discrete change events. The aggregate event may be generated by extracting data from the underlying change events and integrating (e.g., merging, combining, incorporating), arranging (e.g., grouping, consolidating, organizing), or making other modifications to the data. Event aggregation module 212 may perform event aggregation separately on each of the multiple sources. For example, event aggregation module may perform event aggregation on the change events of the directory service (e.g., synchronization events) and also on the change events of the computing device providing the directory service (e.g., security events).

Event aggregation may involve event de-duplication, event filtering, event parsing, other procedures, or a combination thereof. Event de-duplication may involve removing or merging duplicates of the same event or change events that are substantially similar (e.g., similar except for time stamp). Duplicates may include events from multiple different computing devices each have a change event for the same underlying change. Event filtering may involve discarding change events that are irrelevant for the subsequent correlation or directory state analysis. This form of event filtering may be referred to as recipient filtering because the recipient of the change events may perform the filtering and may be contrasted to transmitter filtering which may occur on the remote computing device that the change events are accessed from. Recipient filtering may be advantageous because some access mechanisms may not provide the level of granularity required when requesting change events. Therefore, a request using broad criteria may be transmitted and the resulting change events may be filtered by the recipient using more granular filtering criteria. Event aggregation may also or alternatively involve parsing change events using one or more parsing functions 147.

Parsing functions 147 may involve executable code and configuration data that enables computing device 120 to syntactically analyze a particular change event to interpret data values present in the change event. Each change event may include one or more data values that correspond to different data fields. Descriptors of the data fields may be included within the change event or may be absent from the change event. When the descriptors are included, the change event may include a data field descriptor followed by or preceded by a corresponding data value. When the data field descriptor is absent, the location or order of the data values within the change event may indicate the corresponding data fields. For example, the first three data values may correspond to the data fields of time, object identifier, and entity identifier in that order or any other predefined order. A parsing function may be used by computing device 120 to determine which data values correspond to which of the data fields. Parsing functions 147 may be used to perform data extraction on relevant data values of a change event (e.g., data extraction) or may be used to remove irrelevant data values from the change event (e.g., data stripping).

Parsing functions 147 may include multiple different parsing functions to interpret different types of change events. For example, a first parsing function may be used to parse directory change events, such as, directory synchronization events and a second parsing function may be used to parse device change events, such as, device security events. The parsing functions may be stored by data store 140 and selected depending on which change events are being analyzed. The first parsing function may parse synchronization events of the directory by identifying an event provider identifier and an event identifier within each of the change events. Parsing function 147 may then determine the portion of the active directory affected by the change event. This may involve calculating the active directory partition associated with the change event. The parsing function may translate the fully qualified domain name (FQDN) of the computing device associated with the change event (e.g., the domain controller) to an invocation identifier (e.g., GUID) and translate one or more data values of the change event to domain attribute names or domain attribute identifiers. This data may be used to determine the directory change type for the change event which may be one or more of create, delete, modify, move, restore, change password, reset password, other operation, or a combination thereof.

Storage module 214 may store the data of source access module 210 and event aggregation module 212 in data store 140. Data store 140 may include one or more data storage devices that store data in a database, file system, other data storage system, or a combination thereof. In one example, data store 140 may include a relational database system that uses tabular relations and may provide access to data using a standard query language (SQL). In another example, data store 140 may include a non-relational data store (e.g., file system) without tabular relations and may provide access to data using an interface (e.g., file system API) without supporting a standard query language. Storage module 214 may store the data in the form of change events, aggregate events, data values, translated data, other data, or a combination thereof. As shown in FIG. 2, storage module 214 may store data from different sources in the same data store (e.g., first source data 142 and second source data 144) but in other examples, the data from different sources may be stored in different data stores.

Multiple source correlation component 124 may analyze the data derived from each of the multiple sources and correlate change events across the multiple different sources. Multiple source correlation component 124 may use the data received by source access module 210 (e.g., change events), the data generated by event aggregation module 212 (e.g., aggregate events), or a combination thereof. Multiple source correlation component 124 may incorporate one or more features of change analysis component 122 to identify correlated change events. The correlated change events may be similar to aggregate events and may summarize some or all of the data contained in the underlying change events. In one example, the aggregate events may summarize underlying events from a particular source and a correlated event may summarize underlying events from multiple different sources. Therefore, a correlated event may be a logical event that represents a plurality of discrete change events from multiple different sources. In one example, multiple source correlation component 124 may include a relationship detection module 220 and an enrichment module 222.

Relationship detection module 220 may detect one or more relationships between first source data 142 and second source data 144. The relationships between data of the different sources may be based on direct relationships (e.g., direct match) or indirect relationships (e.g., indirect match). A direct relationship may exist when data of the first source data 142 matches data of the second source data 144. An indirect relationship exists when data of the first source data 142 does not match data of the second source data 144 but when taking into account a third source data 146 the data can be resolved or translated to match. For example, one source of data may correspond to a computer name and another source of data may correspond to an internet protocol (IP) address and neither of these may directly match but when using a third source to resolve the computer name to an IP address or the IP address to a computer name it is determined that the data of one source has an indirect relationship (e.g., indirect match) with the data of the other source. A direct or indirect match occurs when some or all of the data from different sources are substantially similar (e.g., identical or partially identical) or can be resolved using a third source to be identical.

Third source data 146 may be used to resolve differences between data from different sources. Resolving differences may involve mapping, translating, converting, or other action from data of a first source using data of another source. Third source data may change over time and may relate to login data, network use data, location data, other data, or a combination thereof at particular points in time. In one example, third source data 146 may indicate which domain entities are associated with one another over time (e.g., which user accounts are logged-into which devices). In another example, third source data 146 may also or alternatively indicate which devices are associated with which network addresses. Resolving data may be transitive and involve multiple mapping steps. For example, a user account (e.g., user security identifier (SID)) may be mapped to a device (e.g., computer SID) and the device may be associated with an IP address at a point in time. Therefore, changes corresponding to a particular user, device, or IP address may be resolved (e.g., translated) for aggregation or correlation purposes.

Enrichment module 222 may access data determined by relationship detection module 220 and may use it to generate enriched modification data 148. Enriched modification data 148 may be based on directory modification data extracted from change events received from the directory service. In the examples discussed above, the modification data may be based on synchronization events (e.g., replication data) received from a domain controller hosting the directory service. The synchronization events may include modification data of the directory and may be absent data that indicates the computing entity initiating the modification. The computing entity may exist in data from another source such as within second data source 140, which may be derived from security events from the domain controller. The computing entity may be associated with the domain controller that caused the directory modification or may be a client device that initiated the operation that resulted in the domain controller causing the directory modification. In either example, the computing entity may correspond to one or more computer accounts (e.g., client devices, domain controllers), user accounts (e.g., user account, administrator account), or a combination thereof. Enrichment module 222 may use the relationship data to correlate particular modifications represented by first source data 142 with particular computing entities represented by second source data 144. The correlated data may be used to generated enriched modification data 148, which may involve integrating (e.g., merging, combining, incorporating), arranging (e.g., grouping, consolidating, organizing), or making other modifications to first source data 142.

Domain state analysis component 126 may access data of data store 140 to determine one or more states of the directory service at a prior point in time. In one example, domain state analysis component 126 may include a prior state determination module 230, a state comparison module 232, an inconsistency detection module 234, and a reversion module 236.

Prior state determination module 230 may enable computing device 120 to determine a prior state of the directory service based on the data of data store 140. Determining the prior state of the directory service may involve determining a state of at least one domain object of the directory service by analyzing a portion of the modification data that relates to the domain object. In one example, prior state determination module 230, may determine a prior state of a portion of a directory service by analyzing the modifications stored in data store 140 without comparing it to the current state or to a historical state of the directory service. In another example, prior state determination module 230 may analyze the stored modification data in view of the current state of the directory service to determine the prior state of the directory service. This may enable the prior state determination module 230 to work backwards through the modifications (e.g., reverting or undoing modifications) to arrive at the prior state of the directory service. In another example, prior state determination module 230 may have access to a historical state of the directory service and may analyze the stored modification data in view of the historical state to determine the prior state. The historical state may be after the prior state or before the prior state. When the prior state is before the historical state the modification data may be applied to the historical state and when the prior state is before the historical state the modification data may be reverted from the historical state.

State comparison module 232 may compare one or more states of directory service to detect changes that occurred between the different states. State comparison module 232 may rely on modification data, the prior state, the current state, or a combination thereof when performing a comparison. In one example, state comparison module 232 may query data store 140 for the modifications that occurred during two particular times and use that to display the comparison between two states of the directory service. In another example, state comparison module 232 may use prior state determination module 230 to determine the state of the directory service at two different points in time and then compare one or more directory object from the priro states to determine the changes.

Inconsistency detection module 234 may analyze data of data store 140 to discover one or more inconsistencies. The inconsistencies may be referred to as anomalies, discrepancies, intrusions, irregularities, or other term and may exist when a change event that is typically represented by multiple sources is absent from one or more of the sources. An inconsistency may exist due to malicious activity, data corruption, service failure, other cause, or a combination thereof. The malicious activity may intend to compromise a computing environment and may make modifications to the directory service to gain access to one or more resources. The malicious activity may also perform operations to a data source to avoid the creation of change events or to remove existing change events to hide occurrence of the malicious activity. In one example, the malicious activity may disable change tracking features prior to making modifications and then re-enable the change tracking features after the modifications are made. In another example, the malicious activity may remove one or more change events after they are created. In either example, the change events representing the malicious activity may be absent from a data source and may avoid the malicious activity from being detected.

Inconsistency detection module 234 may detect that a change event is absent from a data source by identifying a pattern and detecting exceptions to the pattern. A pattern may be an event correlation pattern that is based on one or more previously detected correlations between multiple different data sources. For example, if a particular type of modification of a directory object (e.g., addition of a group member) always includes a corresponding security event identifying the entity that initiated the modification then inconsistency detection module 234 may generate a rule to reflect the pattern. When a subsequent similar modification is made and is represented by a synchronization event but not by a corresponding security event then the rule may be violated and the inconsistency detection module 234 may generate an indication of the inconsistency (e.g., pattern deviation). The indication may be one or more data entries that indicate the inconsistency and may be recorded in data store 140 or may be transmitted to one or more computing devices (e.g., client device, domain controller, etc). Inconsistency indications may be subsequently retrieved, assessed, accumulated, or displayed and may or may not trigger an alert.

Reversion module 236 may access data of data store 140 and use the data to remove one or more modifications to the directory service. In one example, reversion module 236 may enable computing device 120 to revert to an earlier state of the directory server (e.g., historical state). In another example, reversion module 236 may perform a reversion based on a subset of the modifications so that a portion of the directory service (e.g., particular domain objects) is changed and another portion is not so that the new state of the directory service does not merely reflect a historical version of the directory service.

Reversion module 236 may perform the reversion using the enriched modification data 148. Traditional directory services may include modification data (e.g., synchronization events) that indicate the directory objects that changed but may not indicate the computing entity that initiated the change. By using modification data that is enriched with the computing entity data the reversion module 236 may revert some or all of the changes initiated by a particular user (e.g., malicious user) or by a particular device (e.g., compromised or malfunctioning device).

Figure 3:
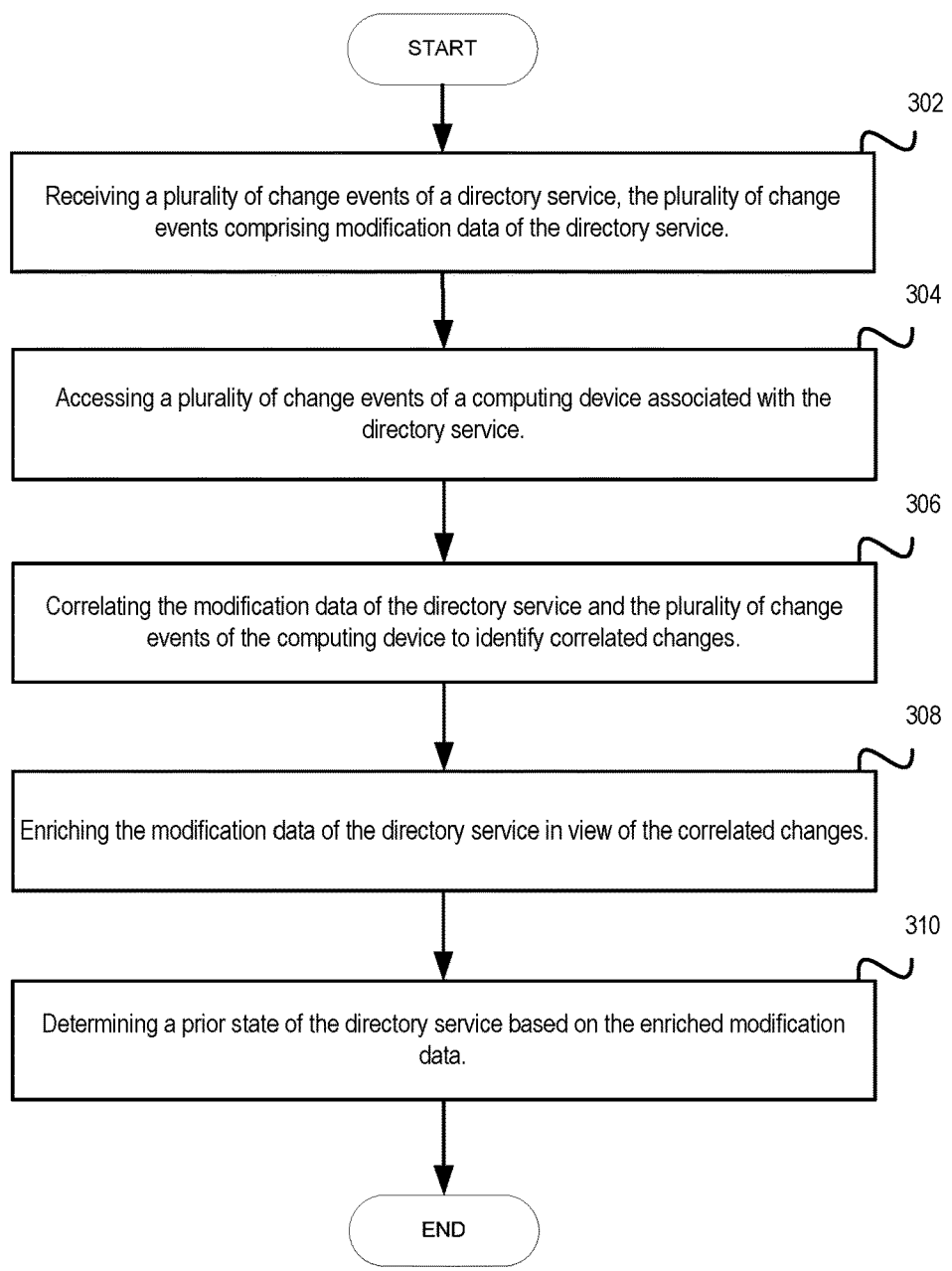
FIG. 3 is a flow diagram illustrating an exemplary operation of change tracking, according to some implementations.

FIG. 3 depicts a flow diagram of example method 300 for analyzing and tracking a directory service in accordance with an aspect of the invention. Method 300 may be performed by processing devices that may comprise hardware (e.g., circuitry, dedicated logic), software (such as is run on a general purpose computer system or a dedicated machine), or a combination of both. Method 300 and each of its individual functions, routines, subroutines, or operations may be performed by one or more processors of the computer device executing the method. In certain implementations, method 300 may each be performed by a single processing device. Alternatively, method 300 may be performed by two or more processing devices, each processing device executing one or more individual functions, routines, subroutines, or operations of the method.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 300 may be performed by computing device 120 of FIGS. 1 and 2.

Method 300 may be performed by processing devices of a server device or a client device and may begin at block 302. At block 302, the processing device may receive a plurality of change events of a directory service. The plurality of change events may include modification data of the directory service over a particular duration of time. A computing device may provide the directory service to a plurality of client devices using a lightweight directory access protocol (LDAP). In one example, the directory service may include an Active Directory domain and the computing device may be a domain controller. The processing device may transmit to the domain controller a synchronization request comprising a change value. In response to the request, the processing device may receive multiple change events of the directory service with change values that exceed the change value of the request. The processing device may then extract the modification data from the multiple change events without applying the modification data to an instance of the directory service.

At block 304, the processing device may access a plurality of change events of a computing device associated with the directory service. The plurality of change events of the computing device may include security events from a log of the domain controller. In contrast, the change events of the directory service may include synchronization packets received from the domain controller providing the directory service. Therefore, the plurality of change events of the directory service may include synchronization data and the plurality of change events of the computing device may include security data. The synchronization data may indicate a particular modification to the directory service and the security data may indicate an entity initiating the particular modification to the directory service.

At block 306, the processing device may correlate the modification data of the directory service and the change events of the computing device to identify correlated changes. Correlating the modification data and the change events may involve performing event aggregation on the change events of the directory service to produce a first aggregate event with modification data. The correlation may also involve performing event aggregation on the change events of the computing device to produce a second aggregate event with security data. The processing device may then detect a relationship between the first aggregate event and the second aggregate event and the relationship may be based on a common feature within the modification data and the security data. In one example, detecting the relationship may involve detecting a globally unique identifier (GUID) of the first aggregate event that matches a GUID of the second aggregate event. In another example, detecting the relationship may involve detecting a security identifier (SID) of the first aggregate event that matches a SID of the second aggregate event. In yet another example, detecting the relationship may involve accessing a remote data source (e.g., third source data) to resolve an identifier of the first aggregate event with a related identifier of the second aggregate event.

Correlation or event aggregation may involve filtering and combining one or more of the change events. The filtering may involve removing one or more change events that are unassociated with a domain object and the combining may involve merging one or more of the plurality of change events into a set of events that are related to the domain object.

At block 308, the processing device may enrich the modification data of the directory service in view of the correlated changes of the computing device. Enriching the modification data may involve updating the modification data of the directory service to comprise the entity initiating the particular modification to the directory service.

At block 310, the processing device may determine a prior state of the directory service based on the enriched modification data. Determining the prior state of the directory service may involve determining a state of at least one domain object of the directory service by analyzing a portion of the modification data that relates to the domain object. The state of the at least one domain object may be different from a current state of the at least one domain object. In one example, the processing device may compare the state of the directory service at a first time with the prior state of the directory service at a second time, wherein the state at the first time and the prior state at the second time are different from a current state of the directory service. In another example, the processing device may discover an inconsistency of the directory service in response to correlating the modification data of the directory service with the plurality of the change events of the computing device, wherein the discovering involves identifying modification data of the directory service that is absent a corresponding change event from the computing device associated with the directory service. Responsive to completing the functions of block 310, method 300 may terminate.

Figure 4:
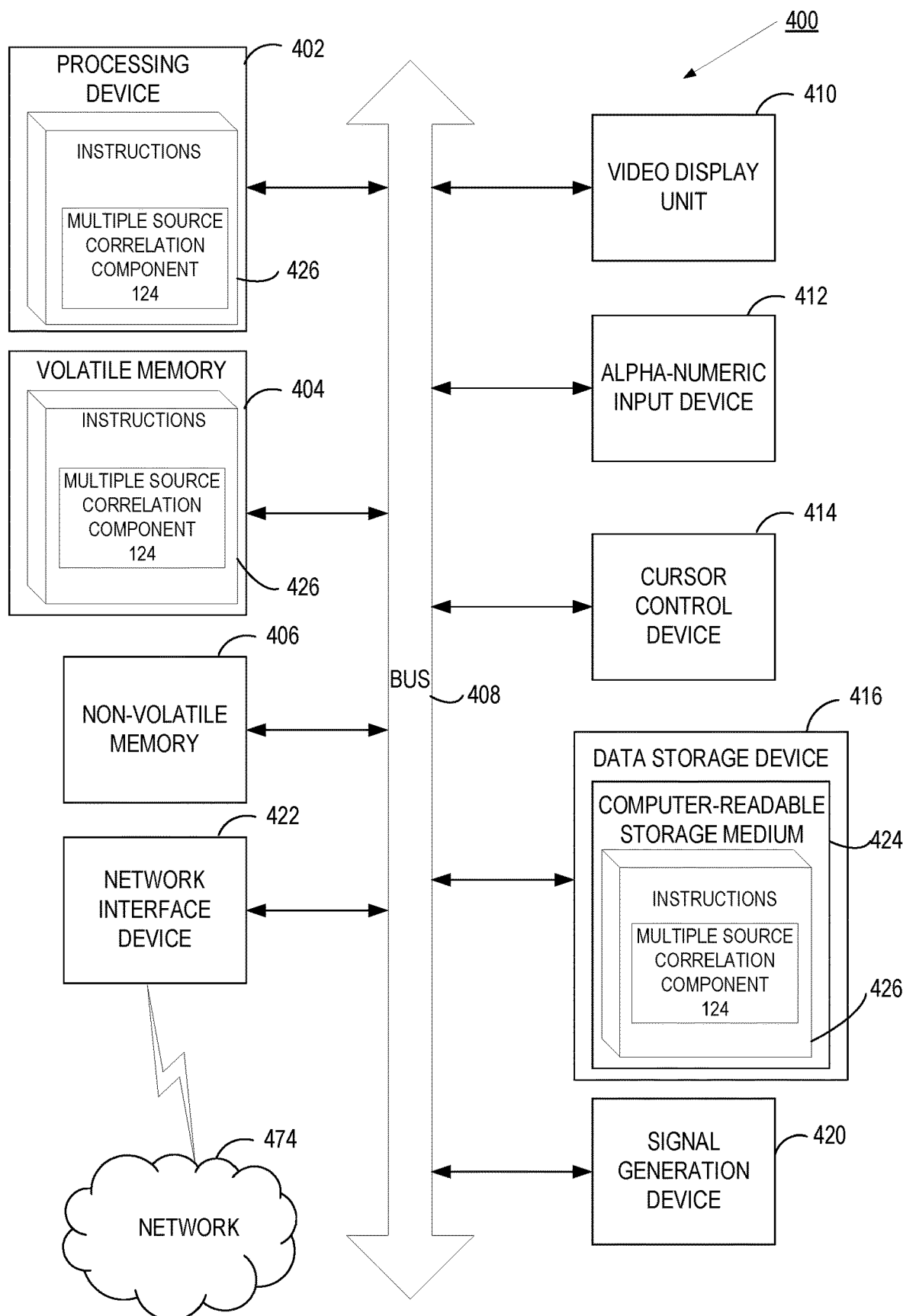
FIG. 4 is a diagrammatic representation of a machine in the exemplary form of a computer system configured to perform one or more of the operations described herein.

FIG. 4 depicts a block diagram of a computer system operating in accordance with one or more aspects of the present disclosure. In various illustrative examples, computer system 400 may correspond to computing devices 112A-C and 120 of FIG. 1.

The computer system may be included within a data center or external to a data center. In certain implementations, computer system 400 may be connected (e.g., via a network, such as a Local Area Network (LAN), an intranet, an extranet, or the Internet) to other computer systems. Computer system 400 may operate in the capacity of a server or a client computer in a client-server environment, or as a peer computer in a peer-to-peer or distributed network environment. Computer system 400 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 400 may include a processing device 402, a volatile memory 404 (e.g., random access memory (RAM)), a non-volatile memory 406 (e.g., read-only memory (ROM) or electrically-erasable programmable ROM (EEPROM)), and a data storage device 416, which may communicate with each other via a bus 408.

Processing device 402 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 400 may further include a network interface device 422. Computer system 400 also may include a video display unit 410 (e.g., an LCD), an alphanumeric input device 412 (e.g., a keyboard), a cursor control device 414 (e.g., a mouse), and a signal generation device 420.

Data storage device 416 may include a non-transitory computer-readable storage medium 424 on which may store instructions 426 encoding any one or more of the methods or functions described herein, including instructions for implementing methods 300 or 500 and for encoding multiple source correlation component of FIGS. 1 and 2.

Instructions 426 may also reside, completely or partially, within volatile memory 404 and/or within processing device 402 during execution thereof by computer system 400, hence, volatile memory 404, and processing device 402 may also constitute machine-readable storage media.

While computer-readable storage medium 424 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs, or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "initiating," "transmitting," "receiving," "analyzing," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. In addition, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general-purpose computer system selectively programmed by a computer program stored in the computer system. Such a computer program may be stored in a computer-readable tangible storage medium.

The methods and illustrative examples described herein are not inherently related to any particular computer or other apparatus. Various general-purpose systems may be used in accordance with the teachings described herein, or it may prove convenient to construct more specialized apparatus to perform method 300 and/or each of its individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:
receiving a plurality of change events of a directory service, wherein the plurality of change events comprise synchronization data of the directory service;
accessing a plurality of change events of a computing device, wherein the computing device is associated with the directory service and the plurality of change events of the computing device comprise log data of the computing device and are absent synchronization data for the directory service;
correlating the synchronization data of the directory service and the log data of the computing device to identify correlated changes;
generating enriched modification data based on the synchronization data of the directory service and the correlated changes;
discovering an inconsistency of the directory service in view of the correlated changes, wherein the discovering comprises identifying modification data of the directory service that is absent a corresponding change event from the computing device; and
determining a prior state of the directory service corresponding to the inconsistency based on the enriched modification data.

2. The method of claim 1, wherein the computing device provides the directory service to a plurality of client devices and the directory service comprises a lightweight directory access protocol (LDAP).

3. The method of claim 1, wherein the directory service comprises an active directory domain and the computing device comprises a domain controller.

4. The method of claim 1, further comprising:
determining a state of the directory service at a first time based on change events of the directory service; and
comparing the state of the directory service at the first time with the prior state of the directory service at a second time, wherein the state at the first time and the prior state at the second time are different from a current state of the directory service.

5. The method of claim 1, wherein discovering the inconsistency of the directory service is in response to correlating the synchronization data of the directory service with a subset of the plurality of the change events of the computing device.

6. The method of claim 1, wherein the plurality of change events of the directory service comprise synchronization packets received from a domain controller providing the directory service and wherein the plurality of change events of the computing device comprise security events from a log of the domain controller.

7. The method of claim 1, wherein the synchronization data indicates a particular modification to the directory service and the log data comprises security data that indicates an entity initiating the particular modification to the directory service.

8. The method of claim 7, wherein generating the enriched modification data comprises associating a portion of the synchronization data of the directory service with the entity initiating the particular modification to the directory service.

9. The method of claim 1, wherein correlating the synchronization data and the log data comprises:
performing event aggregation on the plurality of change events of the directory service to produce a first aggregate event comprising the synchronization data;
performing event aggregation on the plurality of change events of the computing device associated with the directory service to produce a second aggregate event comprising the log data; and
detecting a relationship between the first aggregate event and the second aggregate event, wherein the relationship is based on a common feature within the synchronization data and the log data.

10. The method of claim 9, wherein detecting a relationship between the first aggregate event and the second aggregate event comprises detecting a globally unique identifier (GUID) of the first aggregate event that matches a GUID of the second aggregate event.

11. The method of claim 1, further comprising:
transmitting to a domain controller a synchronization request comprising a change value;
receiving multiple change events of the directory service with change values exceeding the change value; and
extracting the synchronization data from the multiple change events without applying the synchronization data to an instance of the directory service.

12. The method of claim 1, wherein determining the prior state of the directory service comprises determining a state of at least one domain object of the directory service by analyzing a portion of the synchronization data that relates to the domain object, wherein the state of the at least one domain object is different from a current state of the at least one domain object.

13. A system comprising:
a memory; and
a processing device communicatively coupled to said memory, said processing device configured to:
receive a plurality of change events of a directory service, wherein the plurality of change events comprise synchronization data of the directory service;
access a plurality of change events of a computing device that is associated with the directory service, wherein the plurality of change events of the computing device comprise log data of the computing device and are absent synchronization data for the directory service;
correlate the synchronization data of the directory service and the log data of the computing device to identify correlated changes;
discover an inconsistency of the directory service in view of the correlated changes, wherein the discovering comprises identifying modification data of the directory service that is absent a corresponding change event from the computing device;
generate enriched modification data based on the synchronization data of the directory service and the correlated changes; and
determine a prior state of the directory service corresponding to the inconsistency based on the enriched modification data.

14. The system of claim 13, wherein the computing device provides the directory service to a plurality of client devices and the directory service comprises a lightweight directory access protocol (LDAP).

15. The system of claim 13, wherein the directory service comprises an active directory domain and the computing device comprises a domain controller.

16. The system of claim 13, wherein the processing device is further to:

determine a state of the directory service at a first time based on change events of the directory service; and compare the state of the directory service at the first time with the prior state of the directory service at a second time, wherein the state at the first time and the prior state at the second time are different from a current state of the directory service.

17. A non-transitory computer readable storage medium comprising instructions to cause a processor to:

receive a plurality of change events of a directory service, wherein the plurality of change events comprise synchronization data of the directory service;

access a plurality of change events of a computing device that is associated with the directory service, wherein the plurality of change events of the computing device comprise log data of the computing device and are absent synchronization data for the directory service;

correlate the synchronization data of the directory service and the log data of the computing device to identify correlated changes;

discover an inconsistency of the directory service in view of the correlated changes, wherein the discovering comprises identifying modification data of the directory service that is absent a corresponding change event from the computing device;

generate enriched modification data based on the synchronization data of the directory service and the correlated changes of the computing device; and determine a prior state of the directory service corresponding to the inconsistency based on the enriched modification data.

18. The non-transitory computer readable storage medium of claim 17, wherein the computing device provides the directory service to a plurality of client devices and the directory service comprises a lightweight directory access protocol (LDAP).

19. The non-transitory computer readable storage medium of claim 17, wherein the directory service comprises an active directory domain and the computing device comprises a domain controller.

20. The non-transitory computer readable storage medium of claim 17, wherein the processor is further to:

determine a state of the directory service at a first time based on change events of the directory service; and compare the state of the directory service at the first time with the prior state of the directory service at a second time, wherein the state at the first time and the prior state at the second time are different from a current state of the directory service.

* * * * *